US011271276B2

(12) United States Patent
Anderson et al.

(10) Patent No.: US 11,271,276 B2
(45) Date of Patent: Mar. 8, 2022

(54) BATTERY, A FIXTURE FOR FORMING A BATTERY PLATE, A KIT, AND A RELATED METHOD OF MANUFACTURE

(71) Applicant: Teledyne Technologies Incorporated, Thousand Oaks, CA (US)

(72) Inventors: John D. Anderson, Rancho Cucamonga, CA (US); Janak M. Rajpara, Yorba Linda, CA (US)

(73) Assignee: TELEDYNE TECHNOLOGIES INCORPORATED, Thousand Oaks, CA (US)

( * ) Notice: Subject to any disclaimer, the term of this patent is extended or adjusted under 35 U.S.C. 154(b) by 0 days.

(21) Appl. No.: 16/840,698

(22) Filed: Apr. 6, 2020

(65) Prior Publication Data

US 2021/0313551 A1  Oct. 7, 2021

(51) Int. Cl.
*H01M 50/636* (2021.01)
*H01M 50/30* (2021.01)
*H01M 10/12* (2006.01)
*H01M 50/60* (2021.01)

(52) U.S. Cl.
CPC ....... *H01M 50/636* (2021.01); *H01M 10/121* (2013.01); *H01M 50/30* (2021.01); *H01M 50/60* (2021.01)

(58) Field of Classification Search
CPC .... H01M 50/636; H01M 50/60; H01M 10/20; H01M 10/12
See application file for complete search history.

(56) References Cited

U.S. PATENT DOCUMENTS

| | | | | |
|---|---|---|---|---|
| 2,759,037 A | * | 8/1956 | Orsino | H01M 4/56 429/214 |
| 3,781,175 A | * | 12/1973 | Kinsey | H01M 10/0413 429/95 |
| 2014/0349147 A1 | * | 11/2014 | Shaffer, II | H01M 6/48 429/56 |

* cited by examiner

*Primary Examiner* — Kenneth J Douyette
(74) *Attorney, Agent, or Firm* — K&L Gates LLP (57) ABSTRACT

A battery, a fixture for forming a battery plate, a kit, and a related method of manufacture are provided. The battery comprises a housing and a mechanically actuated valve. The housing defines a cell configured to receive battery plates. The mechanically actuated valve is in fluid communication with the cell and configured to control entry of electrolyte into the cell.

6 Claims, 10 Drawing Sheets

BATTERY, A FIXTURE FOR FORMING A BATTERY PLATE, A KIT, AND A RELATED METHOD OF MANUFACTURE

FIELD OF USE

The present disclosure relates to a battery, a fixture for forming a battery plate, a kit, and a related method of manufacture.

BACKGROUND

Sealed batteries can be filled with electrolyte and activated upon manufacture. The filled batteries may require a predetermined storage temperature and may need to be maintained periodically to retain a suitable charge. Dry charged batteries may not be filled upon manufacture and can require periodic maintenance during operation. There are challenges associated with manufacture and use of both sealed batteries and dry charged batteries.

SUMMARY

One aspect of the present disclosure is directed to a battery comprises a housing and a mechanically actuated valve. The housing defines a cell that is configured to receive battery plates. The mechanically actuated valve is in fluid communication with the cell and is configured to control entry of electrolyte into the cell.

An additional aspect of the present disclosure is directed to a fixture for forming a battery plate. The fixture comprises a housing, and the housing comprises a first end that is open, a second end oppositely disposed from the first end, an interior wall, and at least two partitions. The interior wall defines a housing cavity configured to receive an electrolyte. At least two slots are recessed in the interior wall and extend at least partially through the housing cavity from the first end towards the second end. The at least two partitions are slidably disposed in the at least two slots. A gap is defined between the at least two partitions, and the gap is configured to receive a battery plate.

Yet another aspect of the present disclosure is directed to a method comprising providing a conditioning charge to a battery plate disposed in a fixture comprising an electrolyte. The battery plate comprises a thickness no greater than 0.08 inches. The method comprises removing the battery plate from the fixture and the electrolyte.

It will be understood that the inventions disclosed and described in this specification are not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples presented herein, and the manner of attaining them, will become more apparent, and the examples will be better understood, by reference to the following description taken in conjunction with the accompanying drawings, wherein.

Corresponding reference characters indicate corresponding parts throughout the several views. The exemplifications set out herein illustrate certain embodiments, in one form, and such exemplifications are not to be construed as limiting the scope of the appended claims in any manner.

DETAILED DESCRIPTION OF NON-LIMITING EMBODIMENTS

Various embodiments are described and illustrated herein to provide an overall understanding of the present invention. The various embodiments described and illustrated herein are non-limiting and non-exhaustive. Thus, the invention is not limited by the description of the various non-limiting and non-exhaustive embodiments disclosed herein. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

Any references herein to "various embodiments," "some embodiments," "one embodiment," "an embodiment," or like phrases mean that a particular feature, structure, or characteristic described in connection with the embodiment is included in at least one embodiment. Thus, appearances of the phrases "in various embodiments," "in some embodiments," "in one embodiment," "in an embodiment," or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation. Such modifications and variations are intended to be included within the scope of the present embodiments.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of "1 to 10" includes the end points 1 and 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural, and the use of a plural noun includes the singular, unless the context of the usage requires otherwise.

As used herein, "intermediate" means that the referenced element is disposed between two elements but is not necessarily in contact with those elements. Accordingly, unless stated otherwise herein, an element that is "intermediate" a first element and a second element may or may not be adjacent to or in contact with the first and/or second elements, and other elements may be disposed between the intermediate element and the first and/or second elements.

In sealed batteries, it is typical that the battery plates are formed and the battery is filled with electrolyte prior to delivery of the battery to the end user/retailer. In contrast, dry charged batteries typically are not filled with electrolyte until the battery is ready to be placed in operation. The present inventors discovered that sealed batteries may have undesirable shelf life due to activation of the battery upon manufacture, well prior to placing the battery in operation. The present inventors also discovered that current procedures for forming battery plates in dry charged batteries may be inefficient, and that electrolyte spills/leaks and possible damage to the battery can occur when an operator fills the battery with electrolyte. Additionally, dry charged batteries may have to receive a conditioning charge prior to placing the batteries in operation, which can lead to undesirable lead time to place the batteries in operation. Accordingly, in view of these discovered deficiencies, the present disclosure provides a battery, a fixture for forming a battery plate, a kit including those elements, and associated methods of manufacture.

Figure 1A:
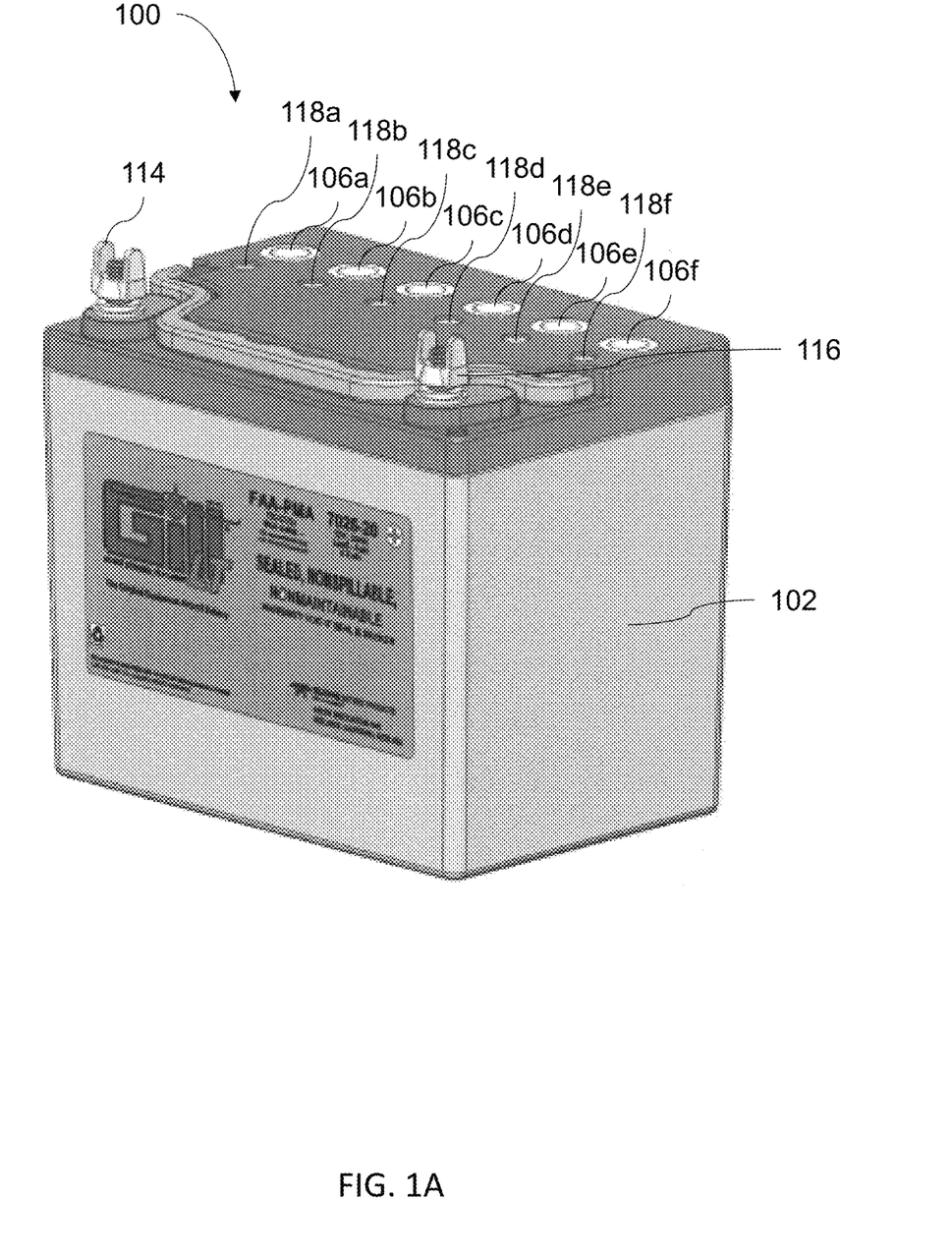
FIG. 1A is a perspective view of a non-limiting embodiment of a battery according to the present disclosure.
Figure 1B:
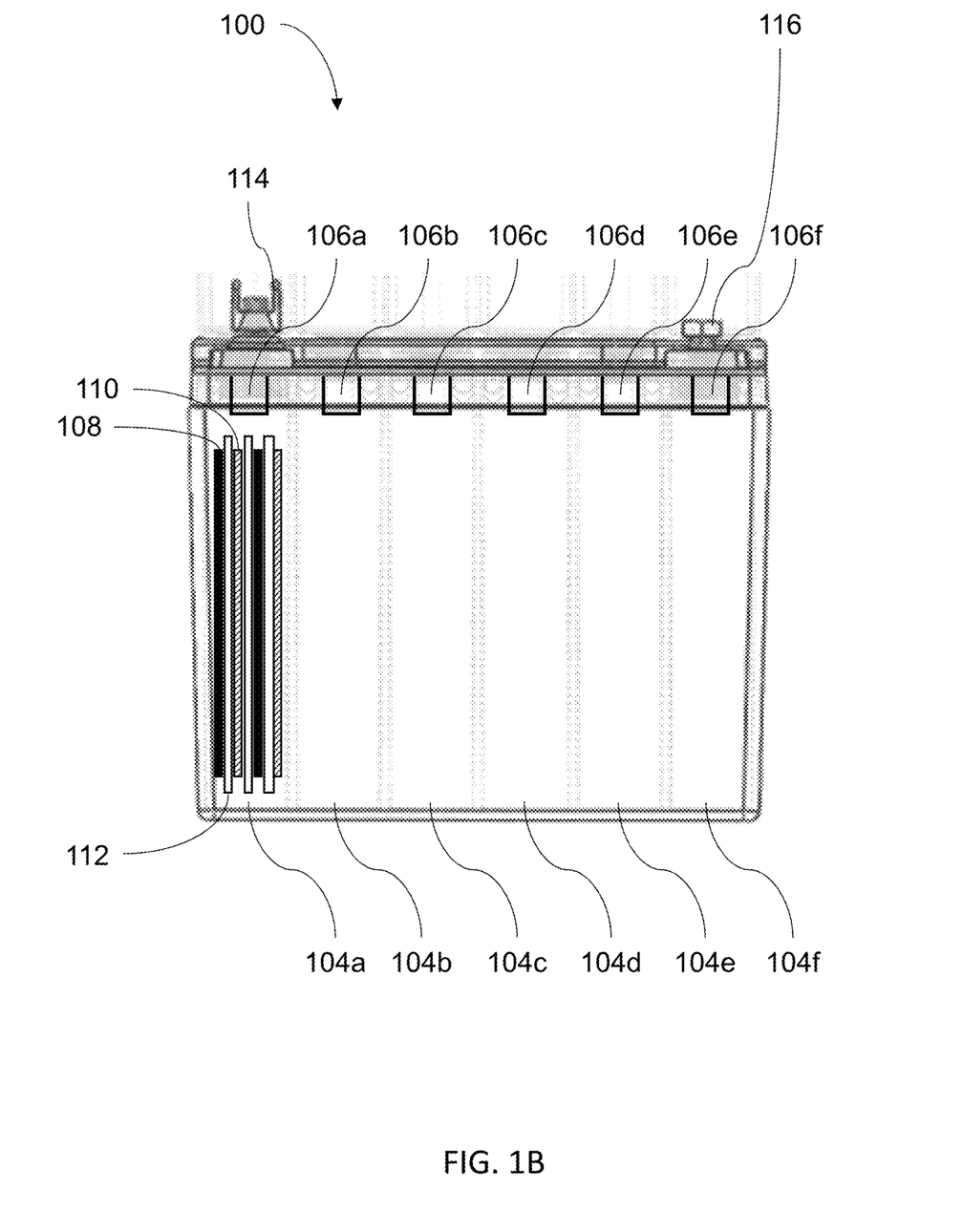
FIG. 1B is a front view of a non-limiting embodiment of the battery of FIG. 1A with a portion of the battery shown as transparent.

FIGS. 1A-1B illustrate a non-limiting embodiment of a battery 100 according to the present disclosure. Battery 100 comprises a housing 102 defining a cell 104a, and a mechanically actuated valve 106a. In various non-limiting embodiments, the housing 102 can comprise at least two cells and at least two mechanically actuated valves, wherein a mechanically actuated valve is associated with each cell. For example, as illustrated, the housing 102 can comprise six cells 104a-104f and six mechanically actuated valves 106a-106f individually associated therewith.

Each mechanically actuated valve 106a-106f can be in fluid communication with and configured to control entry of electrolyte into a different one of the cells 104a-f, respectively. For example: valve 106a can be in fluid communication with cell 104a and can be configured to control entry of electrolyte into cell 104a; valve 106b can be in fluid communication with cell 104b and can be configured to control entry of electrolyte into cell 104b; valve 106c can be in fluid communication with cell 104c and can be configured to control entry of electrolyte into cell 104c; valve 106d can be in fluid communication with cell 104d and can be configured to control entry of electrolyte into cell 104d; valve 106e can be in fluid communication with cell 104e and can be configured to control entry of electrolyte into cell 104e; and valve 106f can be in fluid communication with cell 104f and can be configured to control entry of electrolyte into cell 104f. In various embodiments, each valve 106a-106f can be a one-way valve and the allowed direction of flow through each valve 106a-106f can be into the respective cell 104a-104f. For example, each valve 106a-106f can allow electrolyte to enter the cell and can inhibit electrolyte from passing out of the respective cell 104a-104f.

In order to control entry of electrolyte into the respective cell 104a-104f, each valve 106a-106f can be positioned in various configurations including a closed configuration, an open configuration, and configurations between the closed configuration and the open configurations. The closed configuration of each valve 106a-106f can inhibit passage of electrolyte into the respective cell 104a-104f through the valve 106a-106f, and the open configuration of each valve 106a-106f can allow passage of electrolyte into the cell 104a-104f through the respective valve 106a-106f. The valves 106a-106f can enable rapid and/or facile filling of the cells 104a-104f with electrolyte, which may reduce time to make the battery operational and may limit loss of electrolyte during the filling procedure.

As shown in the accompanying figures, battery 100 can comprise a first terminal 114 and a second terminal 116. Each terminal, 114 and 116, can be associated with one polarity (e.g., positive or negative) of the battery 100. Forming a circuit between the terminals, 114 and 116, can cause electricity to flow between the terminals, 114 and 116. In certain non-limiting embodiments, battery 100 can be configured as a 6 volt DC battery, a 12 volt DC battery, or a 24 volt DC battery.

Each cell 104a-104f can be configured to receive battery plates. For example, as shown in FIG. 1B, battery plates including a first battery plate set 108 and a second battery plate set 110 can be disposed in a respective cell 104a-104f of the battery 100, such as, for example, in cell 104a as illustrated. The first battery plate set 108 can be a first polarity and in electrical communication with the first terminal 114, and the second battery plate set 110 can be a second polarity different than the first polarity and in electrical communication with the second terminal 116.

The battery plate sets, 108 and 110, can be configured in various manners within each cell 104a-104f. For example, a separation layer 112 (e.g., an absorbent glass mat) can be disposed between each of the battery plates. The separation layer 112 can retain (e.g., wick) electrolyte such that the electrolyte is in close proximity to the battery plate sets, 108 and 110. In various non-limiting embodiments, battery 100 can be a dry charged battery, a sealed battery, or a combination thereof. In certain non-limiting embodiments, the battery plate sets, 108 and 110, can be configured as dry charged battery plates.

Battery 100 can be configured with various suitable battery chemistries, such as, for example, lead acid chemistry. In certain non-limiting embodiments, the electrolyte that is disposed in each cell 104a-104f of the battery 100 can comprise sulfuric acid. Additionally, in various non-limiting embodiments the first battery plate set 108 can comprise lead dioxide, lead sulfate, or a combination thereof, and the second battery plate set 110 can comprise sponge lead, lead sulfate, or a combination thereof. For example, in one non-limiting embodiment battery 100 can be a lead acid battery.

In various non-limiting embodiments, and as shown in FIG. 1A, battery 100 can comprise a relief valve 118a-118f in fluid communication with each cell 104a-104f. The relief valves 118a-118f can relieve pressure that may build up in each cell 104a-104f. For example, electrolyte in each cell 104-104f may off-gas during battery operation and/or storage, which can lead to a pressure build up in the cells 104-104f. Responsive to the pressure build up, the relief valves 118a-118f may allow fluid to pass out of the cells 104a-104f and reduce pressure therein. In various examples, the relief valves 118a-118f are one-way valves and the permitted direction of flow through each relief valve 118a-118f can be a direction out of the respective cell 104a-104f (e.g., a direction opposite one-way valves 106a-106F). In certain non-limited embodiments, battery 100 can be a valve regulated battery, such as, for example, a valve regulated lead acid battery. In various non-limiting embodiments, battery 100 can be a dual one-way valve regulated lead acid battery.

The configuration of battery 100 described herein can limit the maintenance required to upkeep the battery 100 during storage prior to operational use, and during operational use of the battery 100.

Figure 2:
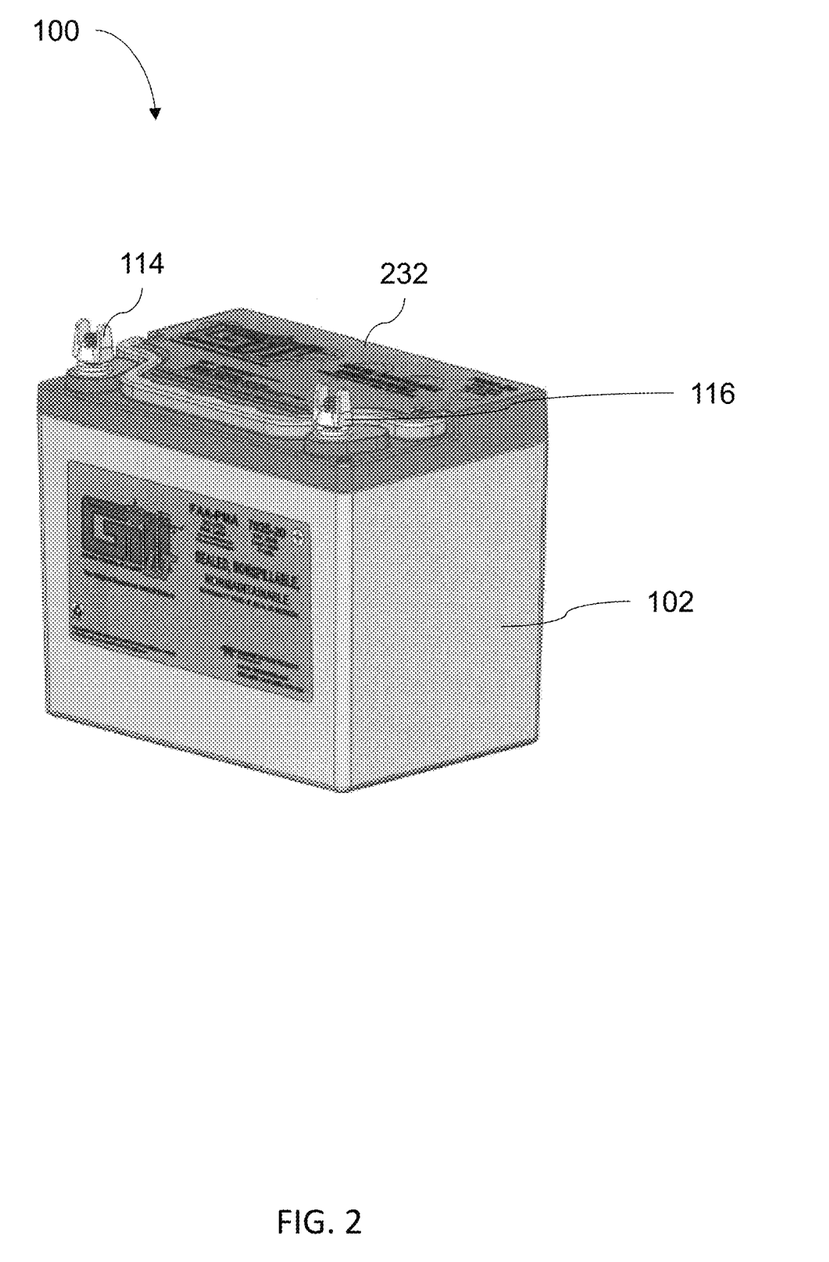
FIG. 2 is a perspective view of the battery of FIG. 1A with a sticker disposed over valves.

FIG. 2 illustrates battery 100 with a sticker 232 placed over the valves 106a-106f and the relief valves 118a-118f. Thus, in various non-limiting embodiments of battery 100 the valves 106a-106f and the relief valves 118a-118f may be concealed from view. In various embodiments, the sticker 232 can protect the valves 106a-106f and the relief valves 118a-118f. The sticker 232 can be removable such that the valves 106a-106f can be accessed for filling the cells 104a-104f with electrolyte.

Figure 3:
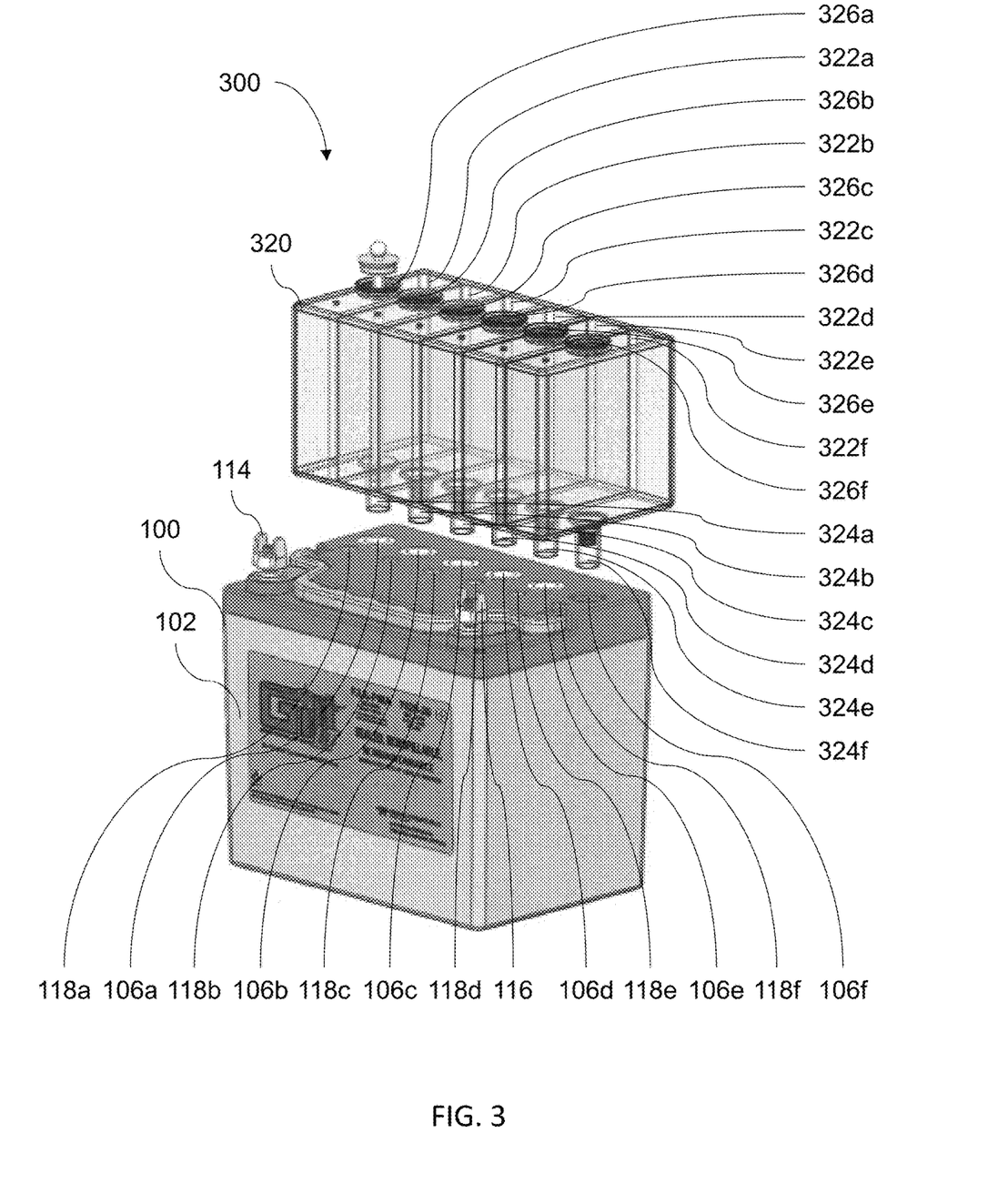
FIG. 3 is a perspective view of a non-limiting embodiment of a kit comprising a battery and an electrolyte container according to the present disclosure, shown in a first configuration.
Figure 4A:
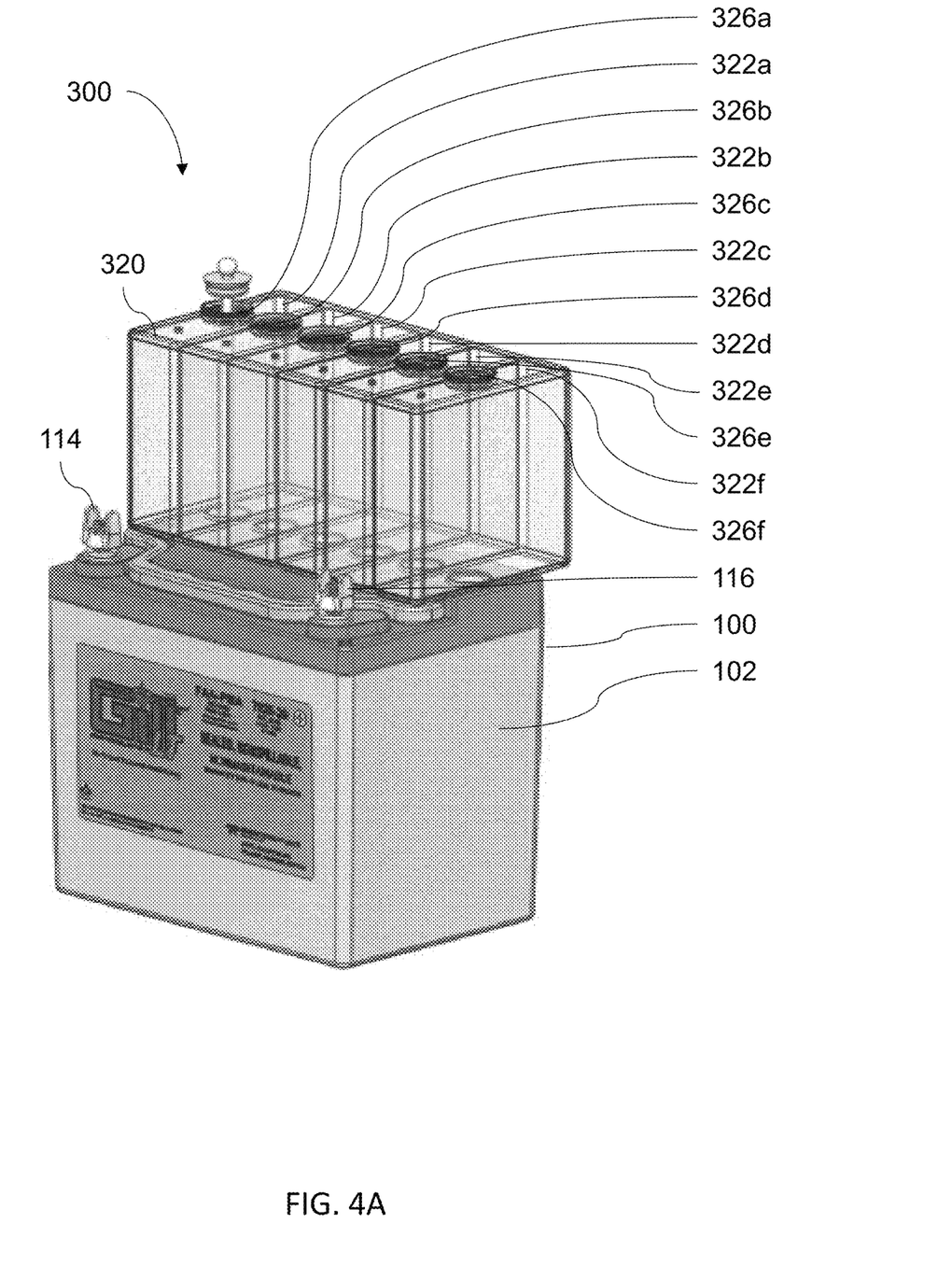
FIG. 4A is a perspective view of the kit of FIG. 3, shown in a second configuration.
Figure 4B:
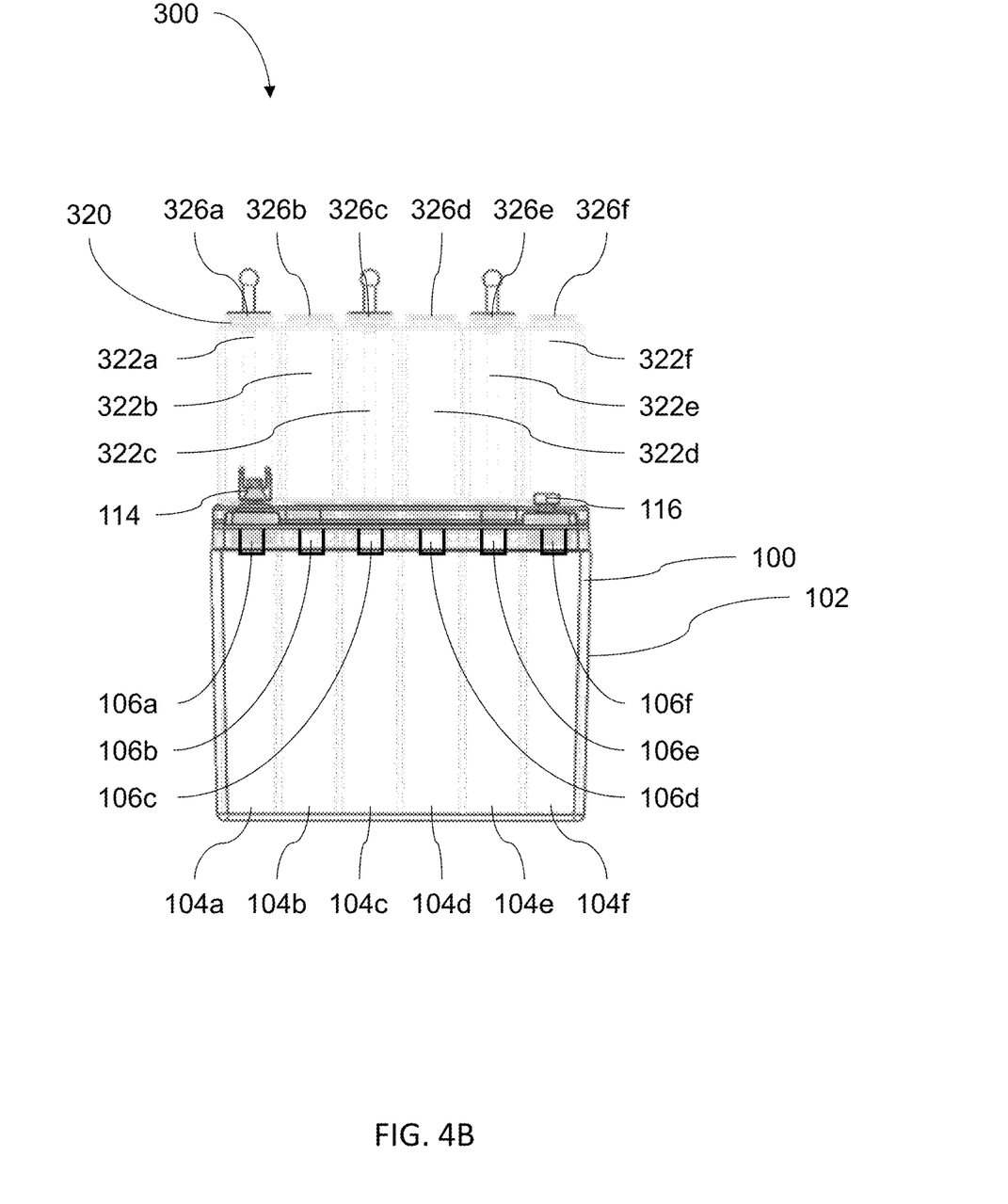
FIG. 4B is a front view of the kit of FIG. 4A, with portion of the battery and the electrolyte container shown as transparent.

Referring to FIGS. 3 and 4A-4B, a kit 300 comprising battery 100 and a container 320 is provided. The container 320 can comprise at least two chambers and at least two ports. For example, the container 320 can comprise a chamber corresponding to each cell 104a-104f of battery 100. As illustrated, the container 320 comprises six chambers 322a-322f Each chamber 322a-322f can define a chamber cavity which is configured to receive a volume of electrolyte suitable to fill one of the cells 104a-104f of the battery 100. For example, each cavity of the chambers 322a-322f can comprise a volume in a range of 80 mL to 500 mL or another volume, as needed to suitably fill the volume. In various embodiments, each chamber 322a-322f contains a volume of an electrolyte, such as, for example, sulfuric acid.

In various embodiments, the container 320 can be a single, continuous piece. In other embodiments, the container 320 can comprise two or more components that are coupled together. For example, each chamber 322a-322f can be a separate component and the components are operatively coupled together to form the container 320.

As illustrated, the container 320 comprises ports 324a-324f. Each port 324a-324f can be in fluid communication with one of the chambers 322a-322f and can be configured to control transport of electrolyte from the chambers 322a-322f to a different one of the cells 104a-f For example: port 324a can be in fluid communication with chamber 322a and can be configured to control transport of electrolyte therefrom; port 324b can be in fluid communication with chamber 322b and can be configured to control transport of electrolyte therefrom; port 324c can be in fluid communication with chamber 322c and can be configured to control transport of electrolyte therefrom; port 324d can be in fluid communication with chamber 322d and can be configured to control transport of electrolyte therefrom; port 324e can be in fluid communication with chamber 322e and can be configured to control transport of electrolyte therefrom; and port 324f can be in fluid communication with chamber 322f and can be configured to control transport of electrolyte therefrom.

The ports 324a-324f can comprise mechanically actuated valves. Additionally, the ports 324a-324f can be configured to mate with the valves 106a-106f. In various non-limiting embodiments, the ports 324a-324f can be configured as "male" mechanically actuated valves, and the valves 106a-106f can be configured as "female" mechanically actuated valves, wherein each valve 106a-106f is configured to receive a corresponding port 324a-324f therein. For example, each port 324a-324f can be sized and configured to be received by a respective valve 106a-106f and to change the configuration of the valves 106a-106f and/or ports 324a-324f to an open configuration allowing electrolyte to pass from a chamber 322a-322f, through a respective port 324a-324f, through a respective valve 106a-106f, and into a respective cell 104a-104f to fill the cell with the electrolyte.

Additionally, the ports 324a-324f can be spaced relative to one another to enable the ports 324a-324f to simultaneously engage the valves 106a-106f such that the cells 104a-104f may be simultaneously filled with electrolyte from the chambers 322a-322f. For example: the spacing between ports 324a and 324b can be substantially the same as the spacing between valves 106a and 106b; the spacing between ports 324b and 324c can be substantially the same as the spacing between valves 106b and 106c; the spacing between ports 324c and 324d can be substantially the same as the spacing between valves 106c and 106d; the spacing between ports 324d and 324e can be substantially the same as the spacing between valves 106d and 106e; and the spacing between ports 324e and 324f can be substantially the same as the spacing between valves 106e and 106f.

In various embodiments, the container 320 can comprise at least two second ports, such as, for example, second ports 326a-326f Each second port 326a-326f can be in fluid communication with one of the chambers 322a-322f and can be configured to equalize pressure in the respective chamber 322a-322f when filling a cell 104a-104f of the battery 100 with electrolyte from the respective chamber 322a-322f For example, the second ports 326a-326f can enable air to backfill the respective chamber 322a-322f while electrolyte is transferred to the cells 104a-104f of the battery 100. Accordingly, the container 320 can enable rapid and/or facile filling of the cells 104a-104f with electrolyte, which can reduce manufacturing time and/or limit loss of electrolyte during filling.

Figure 5A:
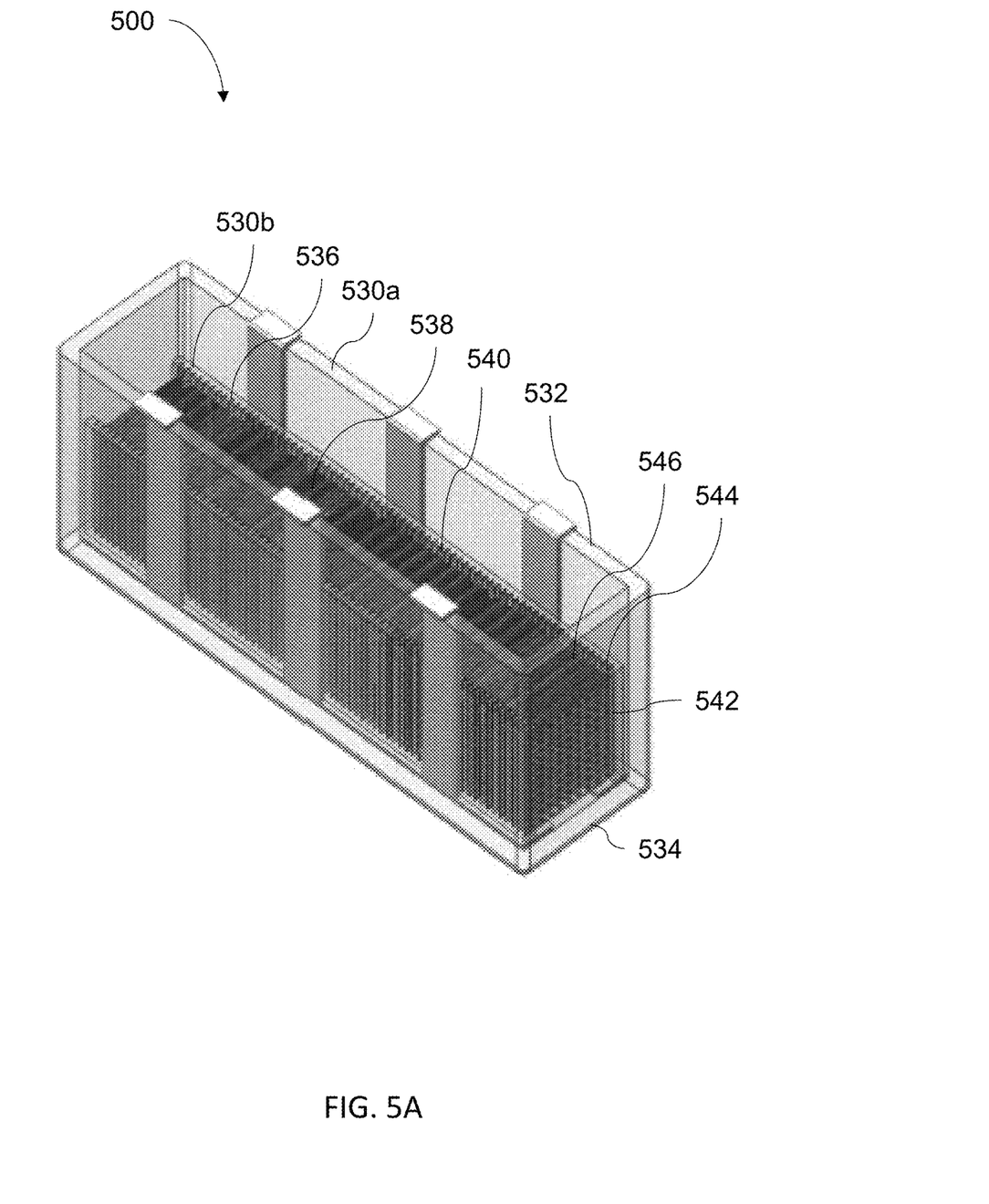
FIG. 5A is a perspective view of a fixture for forming a battery plate according to the present disclosure.
Figure 5B:
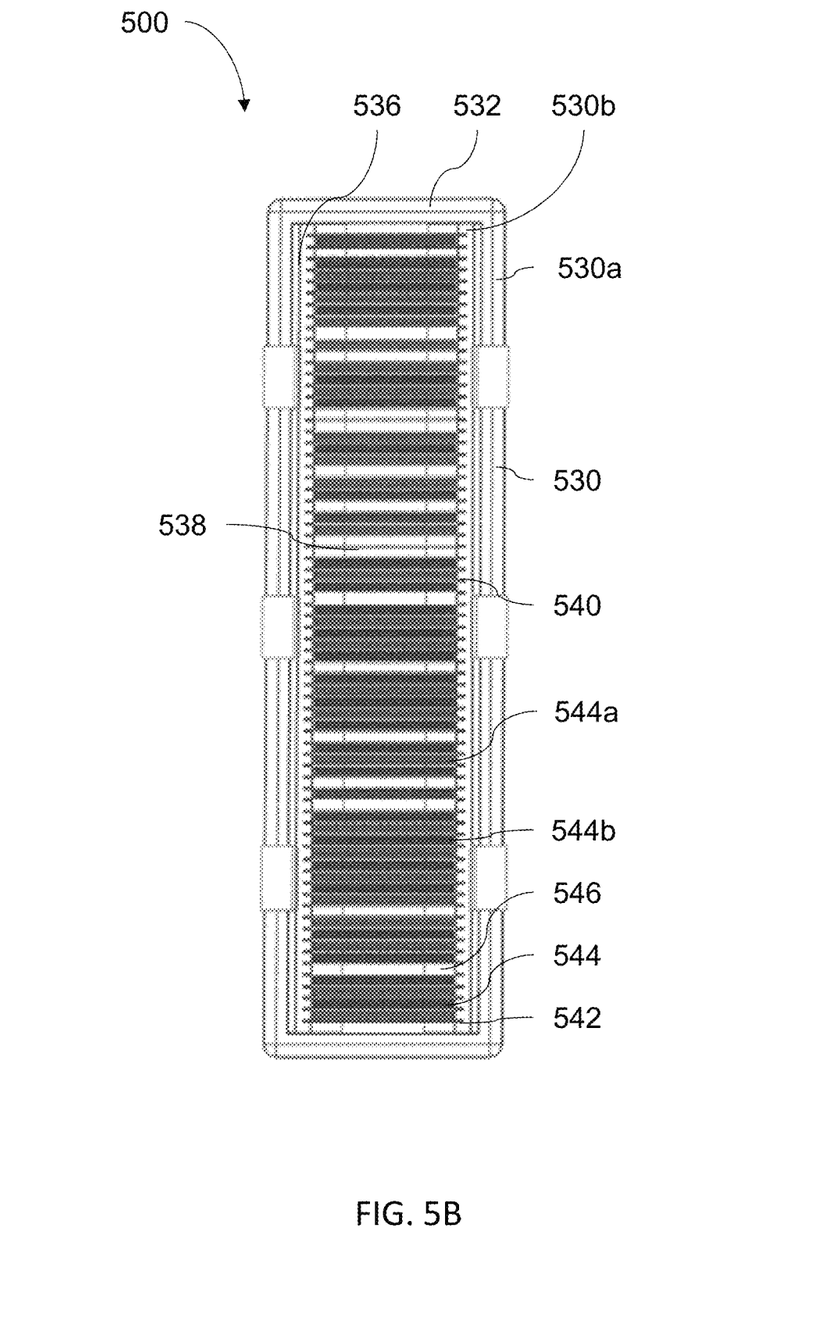
FIG. 5B is a top view of a non-limiting embodiment of the fixture of FIG. 5A.

Referring to FIGS. 5A-5B, a fixture 500 for forming a battery plate is provided. The fixture 500 comprises a housing 530 comprising a first end 532, a second end 534 oppositely disposed from the first end 532, and an interior wall 536. The first end 532 can be open, and the second end 534 can be closed. The interior wall 536 can define a housing cavity 538 configured to receive an electrolyte.

At least two slots 540 can be recessed in the interior wall 536 and extend at least partially through the housing cavity 538 from the first end 532 towards the second end 534. The slots 540 can be configured to receive a battery plate, a partition, or a combination thereof. The slots 540 can be substantially uniformly spaced along the interior wall 536. For example, the slots 540 can be spaced along a longitudinal axis of the housing 530 such that battery plates, partitions, or combinations thereof can be substantially equally spaced apart from one another. In addition, the slots 540 can be substantially the same size. For example, each of slots 540 can comprise the same width, the same length, or a combination thereof.

At least two partitions 542 can be slidably disposed in the slots 540. Gaps 546 can be defined between the partitions 542, and the gaps 546 can configured to receive battery plates 544. The partitions 542 can be perforated such that fluid (e.g., electrolyte) can permeate through the partitions.

In various embodiments, battery plates 544 can be positioned in the gaps. The battery plates 544 may contact the partitions 542 and the battery plates 544 can be inhibited from contacting one another by the partitions 542. In various embodiments, the orientation of the battery plates 544 can be retained by the partitions 542. Each battery plate 544 may comprise a thickness no greater than 0.08 inches, such as, for example, no greater than 0.075 inches, no greater than 0.07 inches, no greater than 0.065 inches, no greater than 0.06 inches, or no greater than 0.05 inches. Each battery plate may comprise a thickness of at least 0.02 inches, such as, for example, at least 0.04 inches, at least 0.045 inches, or at least 0.05 inches. In various embodiments, each battery plate may comprise a thickness in a range of 0.02 inches to 0.08 inches, such as, for example, 0.04 inches to 0.065 inches. In various embodiments, an electrolyte can be disposed in the housing cavity 538, and the battery plates 544 can be submerged in the electrolyte.

A first portion 544a of the battery plates 544b can be configured in electrical communication with a first polarity of an electrical source (e.g., DC voltage source) and a second portion 544b of the battery plates 544 can be configured in electrical communication with a second polarity of the electrical source. Thereafter, battery plates 544 can be subjected to a conditioning charge from the electrical source. The conditioning charge can chemically activate the battery plate 544. For example, in embodiments comprising lead acid chemistry, the conditioning charge can at least partially change lead sulfate on the battery plates 544 into lead dioxide (e.g., positive polarity battery plate) or into sponge lead (e.g., negative polarity battery plate).

The partitions 542 can comprise a material that is substantially non-reactive to the electrolyte and the housing 530 can comprise a material that is substantially non-reactive to the electrolyte. For example, the partitions 542 and the housing 530 can comprise polyethylene. The partitions 542 can comprise a thickness in a range of 0.03 inches to 0.1 inches. For example, the partitions 542 can be 0.0625 inches thick.

In various embodiments, the housing 530 can comprise multiple components. For example, the housing 530 can comprise an outer body 530a and an inner body 530b. The inner body 530b can comprise the interior wall 536 and the slots 540 can be defined on the inner body 530b. The inner body 530b can be configured to be removable from the outer body 530a. Removing the inner body 530b from the outer body 530a can remove battery plates 544 disposed in the slots 540 from the electrolyte in the housing cavity 538.

Utilizing the fixture 500 can enable manufacture of thinner battery plates than typically achievable for a dry charged battery, while enabling the battery plates to be formed prior to their installation in a cell of a battery.

Figure 6:
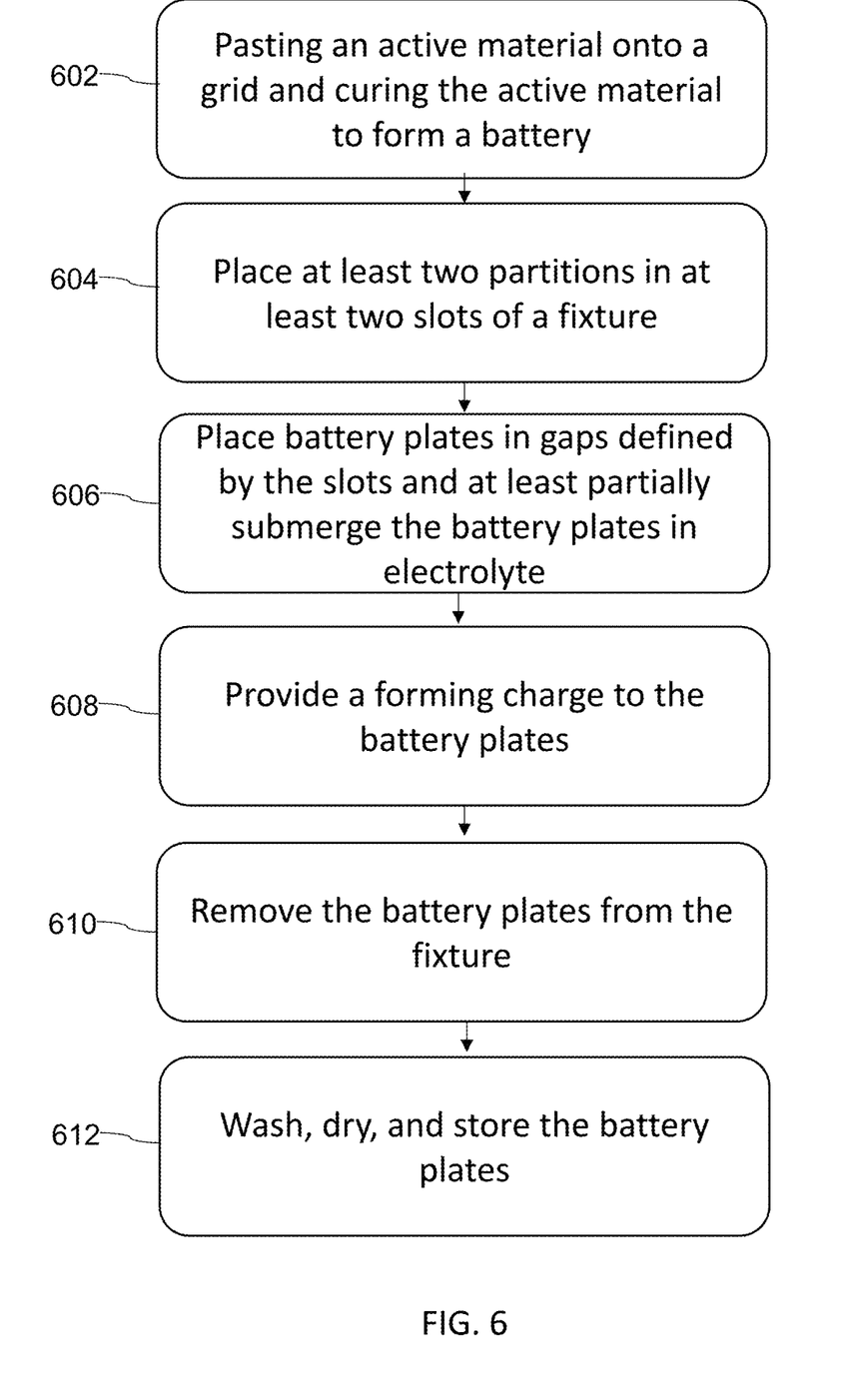
FIG. 6 is a flow chart illustrating a non-limiting embodiment of a method for manufacturing a battery plate according to the present disclosure.

Referring to FIG. 6, a flow chart illustrating a method for manufacturing a battery plate according to the present disclosure is provided. The method comprises, in various embodiments, pasting an active material onto a grid and curing the active material to create a battery plate, 602. At least two partitions can be positioned in at least two slots of a fixture according to the present disclosure, 604. The partitions can define a gap between them, and the fixture can comprise electrolyte. The battery plate can be disposed in the gap and, in various embodiments, the electrolyte can be added to the fixture and the battery plate can be at least partially submerged in the electrolyte, 606.

A conditioning charge can be applied to the battery plate, 608. The conditioning charge can chemically activate the battery plate. The method can comprise removing the battery plate from the fixture and the electrolyte in the housing body, 610. For example, an inner body of the fixture can be removed from an outer body of the fixture.

After removing the battery plate from the fixture and/or electrolyte, the battery plate can be optionally washed and dried, and thereafter stored. For example, the battery plate can be stored for future use as a component in manufacture of a battery. In certain embodiments, at least two battery plates can be formed by steps 602-612.

Figure 7:
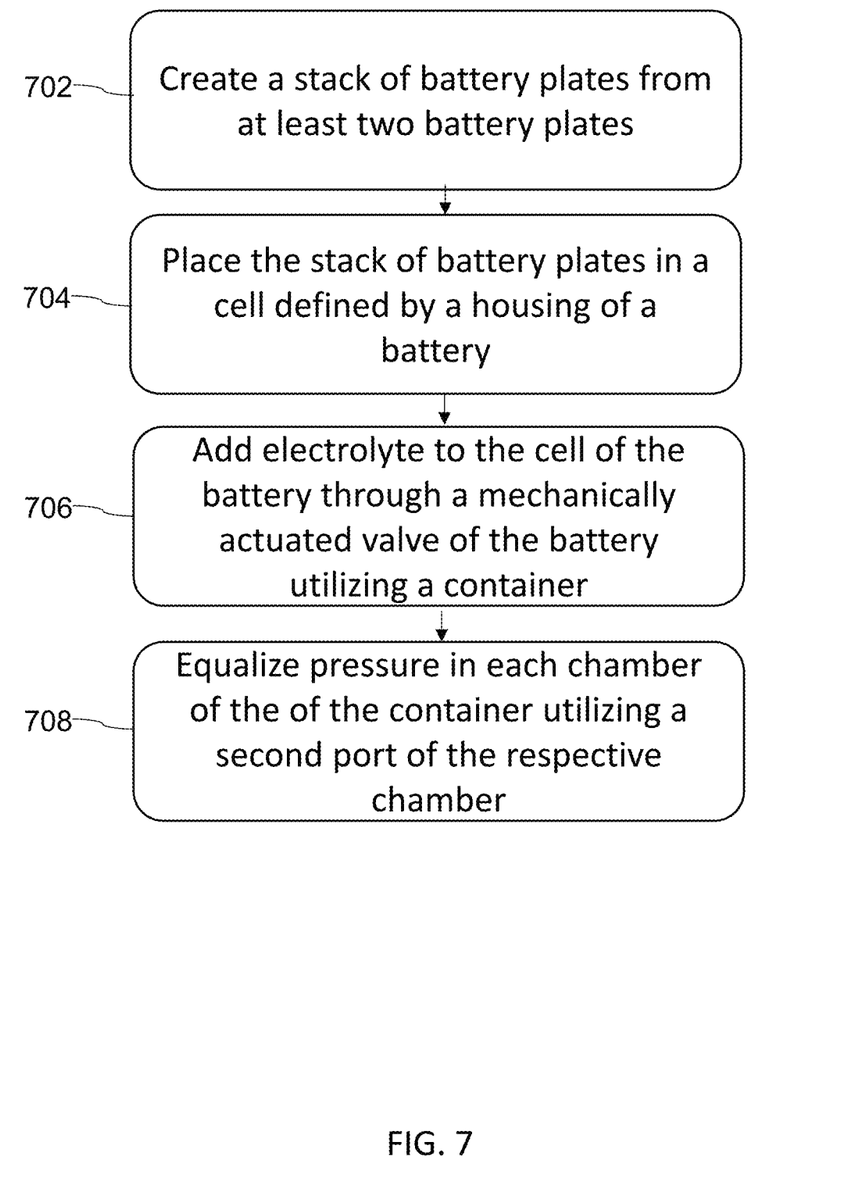
FIG. 7 is a flow chart illustrating a non-limiting embodiment of a method for manufacturing a battery according to the present disclosure.

Referring to FIG. 7, a flow chart illustrating a method of manufacturing a battery according to the present disclosure is provided. As illustrated, a stack of battery plates can be created from at least two battery plates, 702. In various examples, a separator can be placed between each battery plate in the stack. The stack of battery plates can be placed in a cell defined by a housing of a battery according to the present disclosure to create the battery, 704.

In various embodiments, electrolyte can be added to the cell of the battery through a mechanically actuated valve of the battery, 706. In various examples, electrolyte can be added to at least two cells of the battery through the mechanically actuated valve. For example, at least two first ports of a container can be engaged with at least two mechanically actuated valves of the battery. Thereafter, electrolyte can be transferred to the at least two cells from the at least two chambers via the at least two first ports and the at least two mechanically actuated valves. The electrolyte can be added initially after the creation of the battery (e.g., similar to a sealed battery), at a time when the battery is going to be placed in operation (e.g., similar to a dry charged battery), or at a different time. In various examples, pressure in each chamber of the container can be equalized utilizing a respective second port of the respective chamber, 708.

Various aspects of the invention include, but are not limited to, the aspects listed in the following numbered clauses.

1. A battery comprising:
    a housing defining a cell, the cell configured to receive battery plates; and
    a mechanically actuated valve in fluid communication with the cell and configured to control entry of electrolyte into the cell.
2. The battery of clause 1, further comprising a pressure relief valve in fluid communication with the cell.
3. The battery of any one of clauses 1-2, wherein the battery is a valve regulated lead acid battery.
4. The battery of any one of clauses 1-3, wherein the battery plates are dry charged battery plates.
5. The battery of any one of clauses 1-3, wherein the battery is a sealed battery.
6. The battery of any one of clauses 1-5, wherein the mechanically actuated valve is a one-way valve allowing electrolyte to enter the cell.
7. The battery of any one of clauses 1-6, further comprising battery plates disposed within the cell.
8. The battery of any one of clauses 1-7, further comprising an absorbent glass mat between each of the battery plates.
9. The battery of any one of clauses 1-8, wherein the housing further comprises at least two cells and at least two mechanically actuated valves, wherein each mechanically actuated valve is in fluid communication with and is configured to control entry of electrolyte into a different one of the at least two cells.
10. A kit comprising the battery of clause 9 and a container, the container comprising:
    at least two chambers, each chamber defining a chamber cavity, each chamber containing a volume of electrolyte suitable to fill one of the at least two cells of the battery; and
    at least two first ports, each first port in fluid communication with one of the chambers, wherein the at least two first ports are configured to mate with the at least two mechanically actuated valves.
11. The kit of clause 10, further comprising at least two second ports, each second port in fluid communication with one of the chambers, wherein the at least two second ports are configured to equalize pressure in the respective chamber when filling one or more of the cells of the battery.
12. The kit of any one of clauses 1-11, wherein each chamber cavity comprises a volume in a range of 80 mL to 500 mL.
13. The kit of any one of clauses 1-12, wherein each chamber comprises an electrolyte.
14. A fixture for forming a battery plate, the fixture comprising:
    a housing comprising
        a first end that is open,
        a second end, oppositely disposed from the first end,
        an interior wall defining a housing cavity configured to receive an electrolyte, wherein at least two slots are recessed in the interior wall and extend at least partially through the housing cavity from the first end towards the second end, and
        at least two partitions slidably disposed in the at least two slots, wherein a gap is defined between the at least two partitions, and the gap is configured to receive a battery plate.
15. The fixture of clause 14, wherein the at least two partitions are perforated.
16. The fixture of any one of clauses 14-15, wherein the at least two partitions and the housing comprise a material that is substantially non-reactive to the electrolyte.
17. The fixture of any one of clauses 14-16, wherein the at least two slots are substantially uniformly spaced along the interior wall.
18. The fixture of any one of clauses 14-17, wherein the at least two slots are substantially the same size.
19. The fixture of any one of clauses 14-18, wherein the partitions comprise a thickness in a range of 0.03 inches to 0.1 inches.
20. The fixture of any one of clauses 14-19, further comprising the battery plate positioned in the gap.
21. The fixture of clause 20, wherein the battery plate comprises a thickness no greater than 0.08 inches.
22. The fixture of any one of clauses 20-21, wherein an electrolyte is disposed in the housing cavity and the battery plate is at least partially submerged in the electrolyte.
23. The fixture of any one of clauses 14-22, wherein the housing comprises an outer body and an inner body, the inner body comprises the interior wall, the at least two slots are defined on the inner body, and the inner body is removable from the outer body.
24. A method comprising:
    providing a conditioning charge to a battery plate comprising a thickness no greater than 0.08 inches in a fixture comprising an electrolyte; and
    removing the battery plate from the fixture and the electrolyte.
25. The method of clause 24, further comprising pasting an active material onto a grid and curing the active material to form the battery plate.
26. The method of any one of clauses 24-25, wherein the battery plate comprises a thickness no greater than 0.065 inches.
27. The method of any one of clauses 24-26, further comprising storing the battery plate after removing the battery plate from the fixture and the electrolyte.
28. The method of any one of clauses 24-27, further comprising washing and drying the battery plate after removing the battery plate from the fixture and the electrolyte.
29. The method of any one of clauses 24-28, wherein providing a conditioning charge to the battery plate chemically activates the battery plate.
30. The method of any one of clauses 24-29, wherein a conditioning charge is provided to at least two battery plates comprising a thickness no greater than 0.08 inches in the fixture and removing the at least two battery plates from the fixture, the method further comprising:
    creating a stack of battery plates from the at least two plates and placing a separator between each plate; and
    placing the stack of battery plates in a cell defined by a housing of a battery.
31. The method of clause 30, wherein the battery comprises a mechanically actuated valve in fluid communication with the cell and configured to control entry of electrolyte into the cell.
32. The method of clause 31, further comprising adding electrolyte to the cell through the mechanically actuated valve.
33. The method of any one of clauses 31-32, wherein the mechanically actuated valve is a one-way valve allowing electrolyte to enter the cell.
34. The method of any one of clauses 30-33, wherein the battery comprises a pressure relief valve in fluid communication with the cell.

35. The method of any one of clauses 30-34, wherein the battery is a valve regulated lead acid battery.
36. The method of any one of clauses 30-35, wherein the battery plates are dry charged battery plates.
37. The method of any one of clauses 30-36, wherein the battery is a sealed battery.
38. The method of any one of clauses 30-37, wherein the separator comprises an absorbent glass mat.
39. The method of any one of clauses 30-38, wherein the housing of the battery further comprises at least two cells and at least two mechanically actuated valves, wherein each mechanically actuated valve is in fluid communication with and is configured to control entry of electrolyte into a different one of the at least two cells.
40. The method of clause 39, further comprising:
    engaging at least two first ports of a container with the at least two mechanically actuated valves of the battery, the container comprising:
        at least two chambers, each chamber defining a chamber cavity filled with a volume of electrolyte suitable to fill one of the at least two cells of the battery, wherein each first port is in fluid communication with one of the chambers; and
    transferring electrolyte to the at least two cells from the at least two chambers via the at least two first ports and the at least two mechanically actuated valves.
41. The method of any one of clauses 30-40, further comprising equalizing pressure in each chamber utilizing a respective second port of the at least two chambers.
42. The method of any one of clauses 24-41,
    wherein the fixture comprises:
        a housing comprising
            a first end that is open,
            a second end oppositely disposed from the first end, and
            an interior wall defining a housing cavity, wherein at least two slots are recessed in the interior wall extending at least partially through the housing cavity from the first end towards the second end; and
    wherein the method further comprises positioning at least two partitions in the at least two slots, wherein a gap is defined between the at least two partitions.
43. The method of clause 42, further comprising placing the battery plate in the gap.
44. The method of any one of clauses 42-43, further comprising adding electrolyte to the housing cavity.
45. The method of any one of clauses 42-44, wherein the housing of the fixture comprises an outer body and an inner body, the inner body comprises the interior wall, the at least two slots are defined on the inner body, and the method comprises removing the inner body from the outer body after removing the battery plate from the fixture and the electrolyte.
46. The method of any one of clauses 42-45, wherein the at least two partitions are perforated.
47. The method of any one of clauses 42-46, wherein the at least two partitions and the housing comprise a material that is substantially non-reactive to the electrolyte.
48. The method of any one of clauses 42-47, wherein the at least two slots are substantially uniformly spaced along the interior wall.
49. The method of any one of clauses 42-48, wherein the at least two slots are substantially uniform in size.
50. The method of any one of clauses 42-49, wherein the partitions comprise a thickness in a range of 0.03 inches to 0.1 inches.
51. The method of any one of clauses 42-50, further comprising submerging the battery plate in electrolyte in the housing cavity.

One skilled in the art will recognize that the herein described batteries, structures, operations/actions, and objects, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class, and the non-inclusion of specific components, devices, apparatus, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:
1. A method comprising:
   providing a conditioning charge to a plurality of battery plates in a fixture comprising an electrolyte, wherein each of the plurality of battery plates comprises a thickness no greater than 0.08 inches;
   removing the plurality of battery plates from the fixture and the electrolyte;
   creating a plurality of stacks of battery plates from the plurality of battery plates by disposing a separator between adjacent battery plates comprising each of the plurality of stacks of battery plates; and
   placing each stack of battery plates of the plurality of stacks of battery plates in a respective cell of a plurality of cells defined by a housing of a battery, wherein the housing of the battery comprises a plurality of one-way resealable valves, each of the plurality of one-way resealable valves being in fluidic communication with a respective cell of the plurality of cells and configured to control entry of electrolyte into the respective cell of the plurality of cells.
2. The method of claim 1, further comprising simultaneously adding electrolyte to each cell of the plurality of cells through the respective one-way resealable valve of the plurality of one-way resealable valves.
3. The method of claim 1, wherein the battery is a valve regulated lead acid battery.
4. The method of claim 1, wherein each of the plurality of battery plates is a dry charged battery plate.
5. The method of claim 1, wherein the battery is a sealed battery.
6. The method of claim 1, further comprising:
   engaging each of a plurality of first ports of a container with a respective one-way resealable valve of the plurality of one-way resealable valves, the container comprising:
      a plurality of chambers, each chamber of the plurality of chambers defining cavity filled with a volume of electrolyte suitable to fill one of the plurality of cells of the battery,
      wherein each of the plurality of first ports is in fluid communication with a respective chamber of the plurality of chambers; and simultaneously transferring electrolyte to each of the plurality of cells from a respective chamber of the plurality of chambers through the respective one-way resealable valves of the plurality of one-way resealable valves and the respective first ports of the plurality of first ports.

\* \* \* \* \*